(12) United States Patent
Fulper

(10) Patent No.: US 6,836,994 B1
(45) Date of Patent: Jan. 4, 2005

(54) FISH BITING INDICATION DEVICE

(76) Inventor: Robert R. Fulper, 17 Marshall St., Phillipsburg, NJ (US) 08865

( * ) Notice: Subject to any disclaimer, the term of this patent is extended or adjusted under 35 U.S.C. 154(b) by 0 days.

(21) Appl. No.: 10/618,939

(22) Filed: Jul. 15, 2003

(51) Int. Cl.[7] .............................................. A01K 97/12
(52) U.S. Cl. ......................................................... 43/17
(58) Field of Search ............................................. 43/17

(56) References Cited

U.S. PATENT DOCUMENTS

| | | | | |
|---|---|---|---|---|
| 2,601,839 A | * | 7/1952 | Kucewicz ...................... | 43/17 |
| 3,012,352 A | * | 12/1961 | Logsdon ........................ | 43/17 |
| 3,023,532 A | * | 3/1962 | Gorenty ........................ | 43/17 |
| 3,744,172 A | * | 7/1973 | Kelli .............................. | 43/17 |
| 3,814,048 A | * | 6/1974 | Bartholomew ................ | 43/17 |
| 4,125,957 A | * | 11/1978 | Cunningham ................. | 43/17 |
| 4,236,340 A | * | 12/1980 | Cunningham ................. | 43/17 |
| 4,552,318 A | * | 11/1985 | Durham ........................ | 43/17 |
| 4,702,031 A | * | 10/1987 | Sousa ............................ | 43/17 |
| 4,746,253 A | * | 5/1988 | Simmons ...................... | 43/17 |
| 4,823,496 A | * | 4/1989 | Powell .......................... | 43/17 |
| 4,939,864 A | * | 7/1990 | Bowles ......................... | 43/17 |
| 5,077,928 A | * | 1/1992 | Deskevich .................... | 43/17 |
| 5,515,639 A | * | 5/1996 | Phipps .......................... | 43/17 |
| D373,171 S | | 8/1996 | Negreanu | |
| 5,669,175 A | * | 9/1997 | Phipps .......................... | 43/17 |
| 5,678,347 A | * | 10/1997 | Cube ............................. | 43/17 |
| 5,839,218 A | * | 11/1998 | Cafarella ...................... | 43/17 |
| 5,884,429 A | * | 3/1999 | Cube ............................. | 43/17 |
| 6,370,809 B1 | * | 4/2002 | Drew et al. ................... | 43/17 |

FOREIGN PATENT DOCUMENTS

| | | | | |
|---|---|---|---|---|
| CZ | 200000476 A3 | * | 9/2001 | |
| DE | 4130641 A1 | * | 3/1993 | |
| DE | 29613362 B1 | * | 12/1996 | |
| GB | 8980 B1 | * | 4/1907 | 43/17 |
| GB | 1477192 B1 | * | 6/1977 | |
| GB | 2021372 A1 | * | 12/1979 | |
| GB | 2260676 A1 | * | 4/1993 | |
| GB | 2298770 A1 | * | 9/1996 | |
| GB | 2359237 A1 | * | 8/2001 | |
| RO | 107179 B1 | * | 3/1993 | |
| RU | 1119644 B1 | * | 10/1984 | 43/17 |

* cited by examiner

*Primary Examiner*—Darren W. Ark

(57) ABSTRACT

A fish biting indication device includes a ring member having a generally circular shape. The ring member has a substantially smooth outer surface. The ring member has an inner diameter generally between ½ inch and 2 inches. The ring member is positioned over an end of the fishing rod such that the ring member is moved upwardly on the fishing rod when the fishing line is pulled outwardly away from the fishing rod.

4 Claims, 5 Drawing Sheets

FISH BITING INDICATION DEVICE

BACKGROUND OF THE INVENTION

1. Field of the Invention

The present invention relates to fishing biting tools and more particularly pertains to a new fishing biting tool for indicating to person fishing that a fish is biting the fishing line.

2. Description of the Prior Art

The use of fishing biting tools is known in the prior art. While these devices fulfill their respective, particular objectives and requirements, the need remains for a device that is not attached to the fishing line and slides away from the fishing line and the fishing pool once a fish has taken the fishing line.

SUMMARY OF THE INVENTION

The present invention meets the needs presented above by providing a ring member having a generally circular shape. The ring member has a substantially smooth outer surface. The ring member has an inner diameter generally between ½ inch and 2 inches. The ring member is positioned over an end of the fishing rod such that the ring member is moved upwardly on the fishing rod when the fishing line is pulled outwardly away from the fishing rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
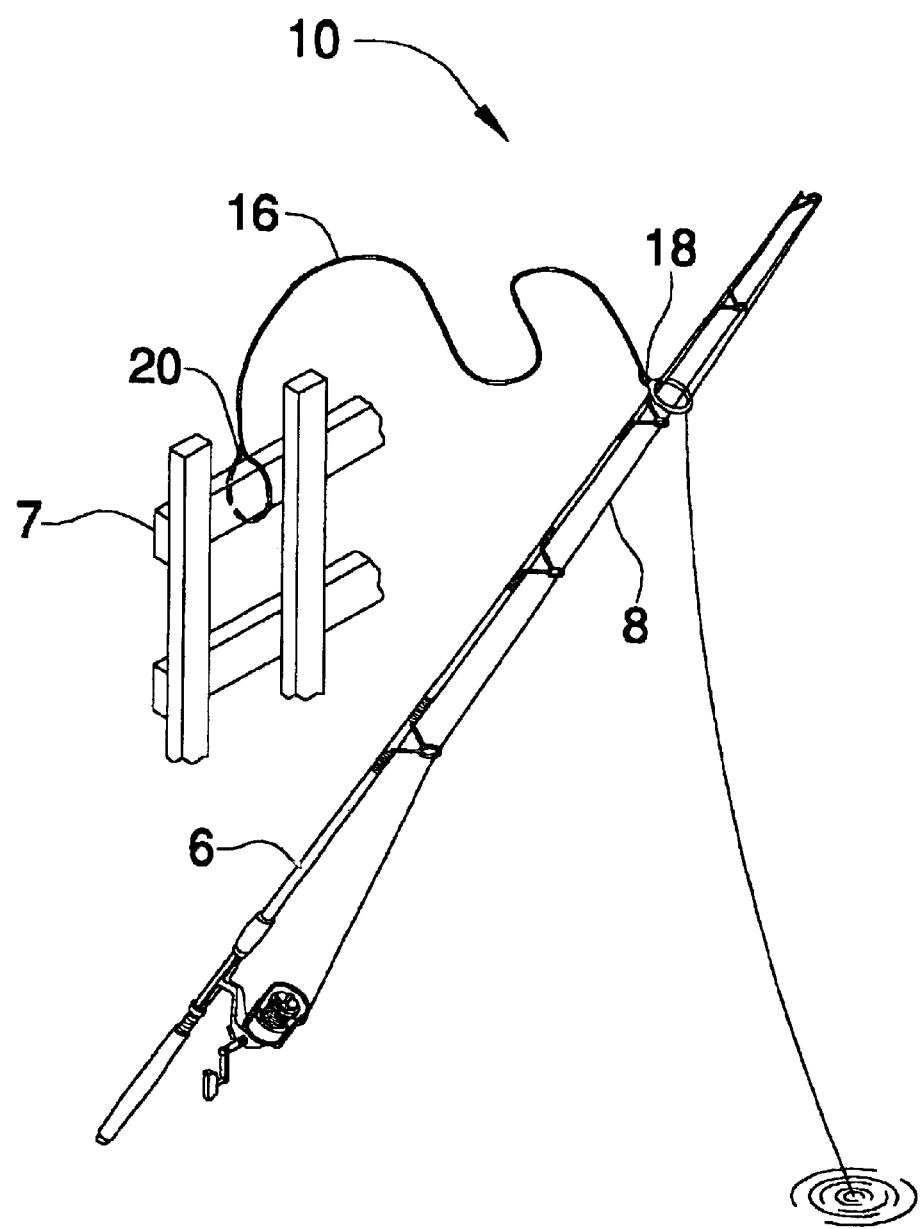
FIG. 1 is a schematic perspective in-use view of a fish biting indication device according to the present invention.

With reference now to the drawings, and in particular to FIGS. 1 through 6 thereof, a new fishing biting tool embodying the principles and concepts of the present invention and generally designated by the reference numeral 10 will be described.

As best illustrated in FIGS. 1 through 6, the fish biting indication device 10 generally comprises a ring member 12 having a generally circular shape. The ring member 12 has a substantially smooth outer surface so that it may freely slide along a fishing rod 6. The ring member 12 has an inner diameter generally between ½ inch and 2 inches. The ring member 12 comprises a resilient plastic material. The plastic material is preferably buoyant in water. Optionally, the plastic material is phosphorescent. This may be either an ambient light induced phosphorescent or may be brought about by a chemical reaction within the ring member. Both methods are conventional and well known in the art of glowing articles.

Figure 2:
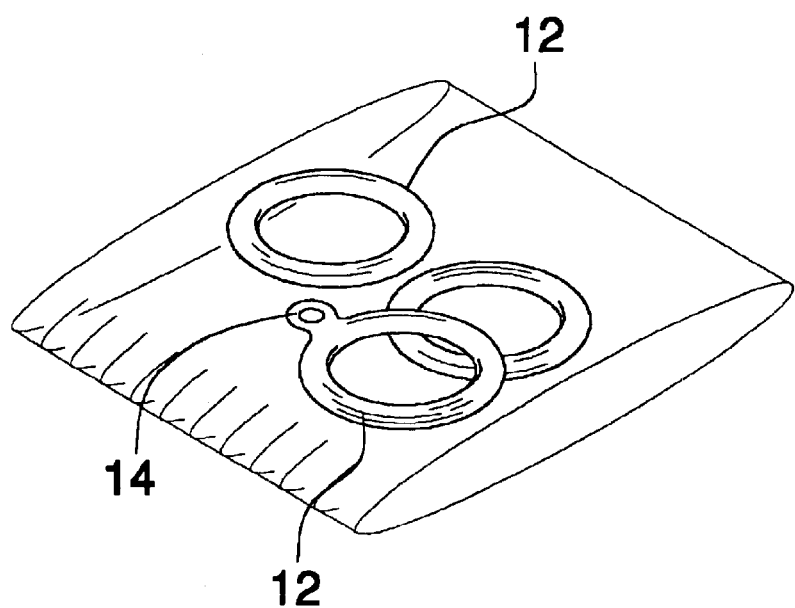
FIG. 2 is a schematic perspective view of alternate embodiments of the present invention.

A loop 14 is optionally attached to the ring member 12. The loop 14 is positioned on an outer circumference of the ring member 12 and has an inner diameter smaller than the inner diameter of the ring member 12. FIG. 2 depicts a plurality of ring members 12, one of which including a loop 14. An elongated tether 16 has a first end 18 and a second end 20. The first end 18 is attached to the loop 14. The second end 20 may be attached to an object 7 to ensure that the ring member 12 is not lost during its use.

Figure 3:
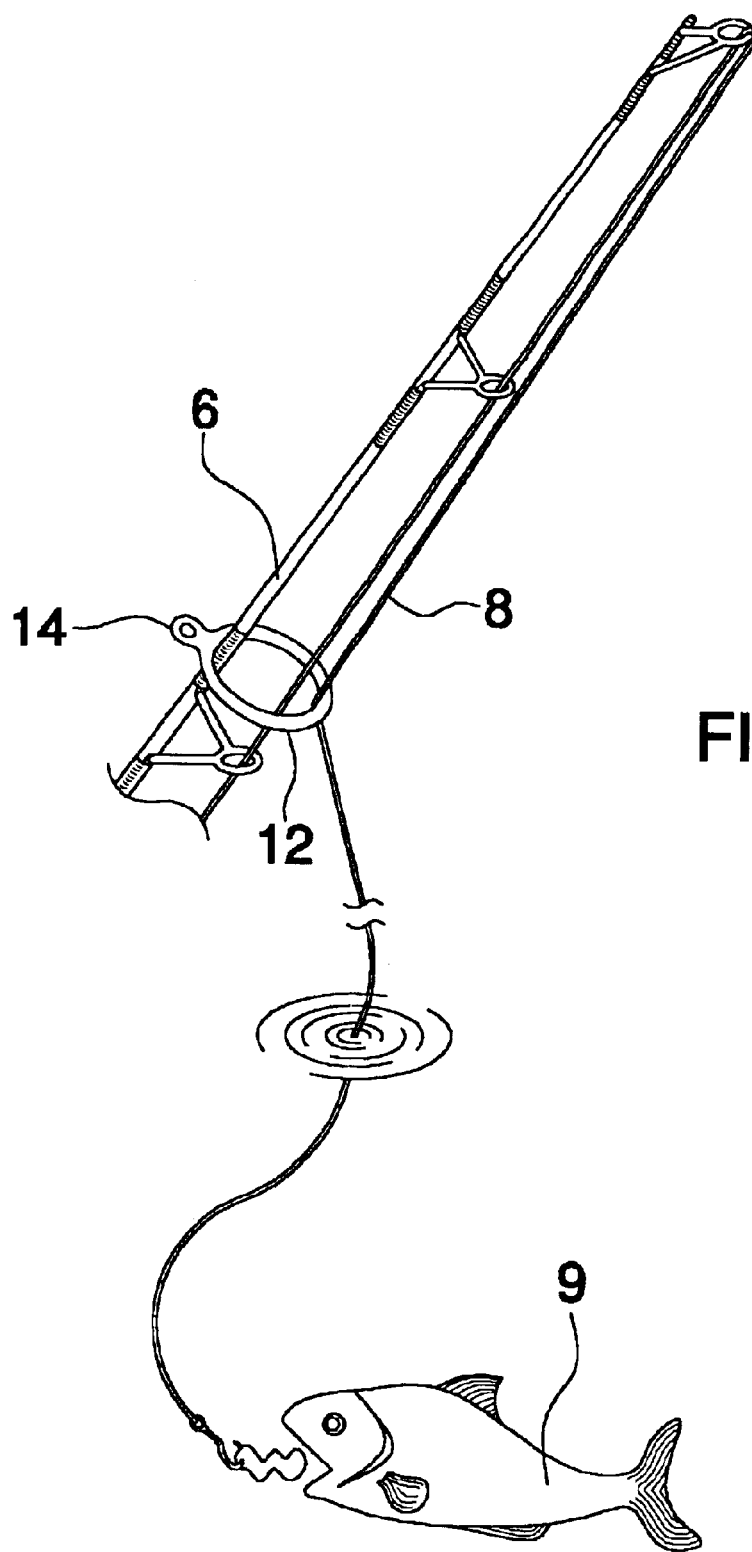
FIG. 3 is a schematic perspective in-use view of the present invention.
Figure 4:
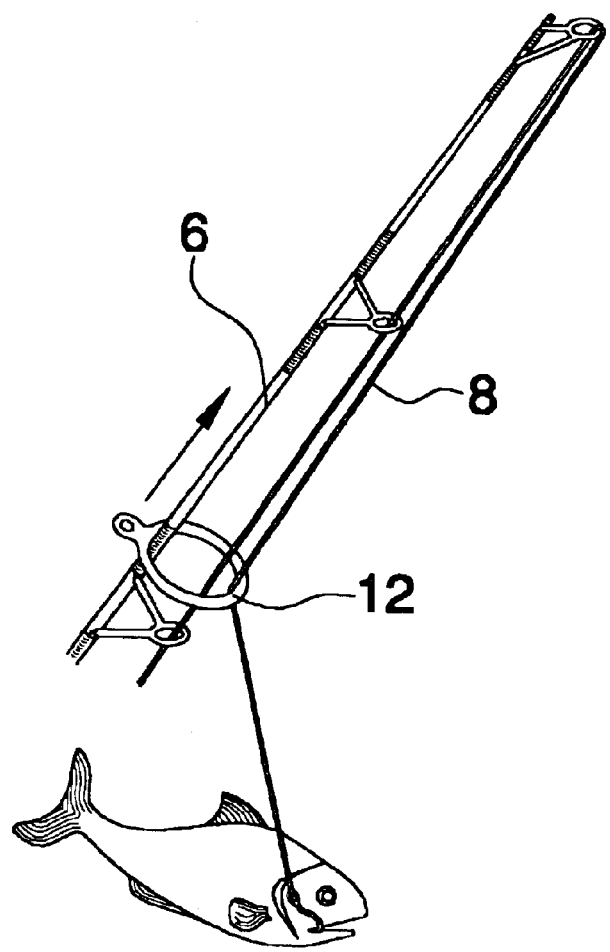
FIG. 4 is a schematic perspective in-use view of the present invention.
Figure 6:
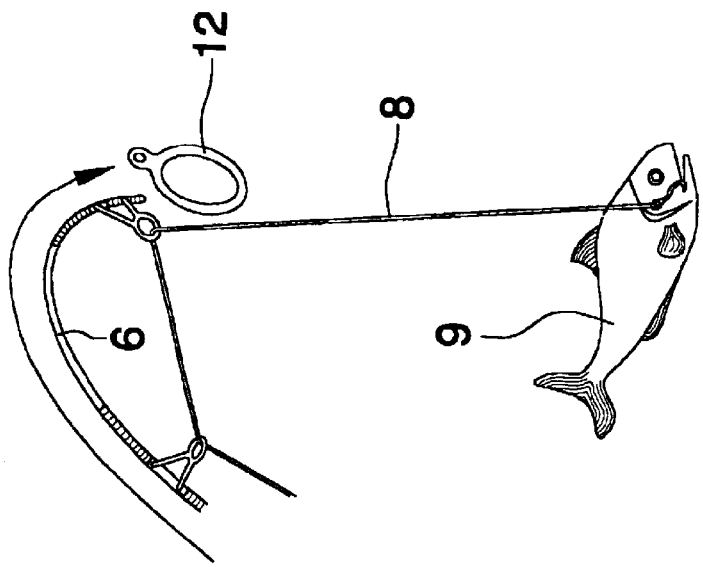
FIG. 6 is a schematic perspective in-use view of the present invention.
Figure 5:
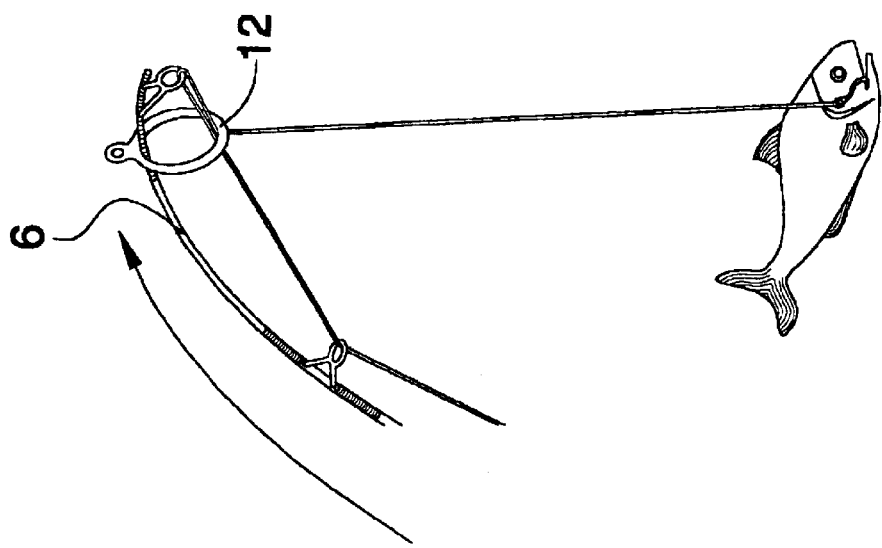
FIG. 5 is a schematic perspective in-use view of the present invention.

In use, the ring member 12 is positioned over an end of a fishing rod 6. The ring member 12 holds fishing line 8, which is strung through the fishing rod 6, adjacent to the fishing rod 6 after it extends away from the fishing rod 6 as shown in FIGS. 1 and 3. As depicted in FIGS. 4–6, the ring member 12 is moved upwardly on the fishing rod 6 when the fishing line 8 is pulled outwardly away from the fishing rod 6. This happens when a fish 9 begins take up the slack in the fishing line 8. The ring member 12 falls away from the fishing rod 6 once it reaches the end of the fishing rod 6. The ring member 12, by its movement, indicates to the user of the fishing rod 6 that a fish 9 has taken the fishing line 8 before the fishing rod 12 bends.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish bite indication device for removably positioning on a fishing rod having fishing line strung therethrough, said device comprising:

a ring member having a generally circular shape, said ring member having a substantially smooth outer surface, said ring member having an inner diameter generally between ½ inch and 2 inches;

a loop being attached to said ring member, said loop being closed, said loop being positioned on an outer circumference of said ring member, said loop having an inner diameter smaller than said inner diameter of said ring member;

an elongated tether having a first end and a second end, said first end being attached to said loop, said second end being attachable to an object spaced from the fishing line; and wherein said ring member is positionable over an end of the fishing rod such that said ring member is moved upwardly on the fishing rod when the fishing line is pulled outwardly away from the fishing rod, wherein said tether is capable of securing said ring member to the object when said ring member falls off said fishing rod such that said ring member is not lost.

2. A fish bite indication device for removably positioning on a fishing rod having fishing line strung therethrough, said device comprising:

a ring member having a generally circular shape, said ring member having a substantially smooth outer surface, said ring member having an inner diameter generally between ½ inch and 2 inches, said ring member comprising a plastic material having buoyancy in water, wherein said ring member is positionable over an end of the fishing rod such that said ring member is moved upwardly on the fishing rod when the fishing line is pulled outwardly away from the fishing rod;

a loop being attached to said ring member, said loop being positioned on an outer circumference of said ring member, said loop having an inner diameter smaller than an inner diameter of said ring member; and an elongated tether having a first end and a second end, said first end being attached to said loop.

3. The fish bite indication device of claim 2, wherein said plastic material is phosphorescent.

4. A fish bite indication device for removably positioning on a fishing rod having fishing line strung therethrough, said device comprising:

a ring member having a generally circular shape, said ring member having a substantially smooth outer surface, said ring member having an inner diameter generally between ½ inch and 2 inches, said ring member comprising a plastic material, said plastic material being buoyant in water, said plastic material being phosphorescent;

a loop being attached to said ring member, said loop being positioned on an outer circumference of said ring member, said loop having an inner diameter smaller than said inner diameter of said ring member;

an elongated tether having a first end and a second end, said first end being attached to said loop; and wherein said ring member is positionable over an end of the fishing rod such that said ring member is moved upwardly on the fishing rod when the fishing line is pulled outwardly away from the fishing rod.

* * * * *